Feb. 19, 1957
A. M. MASCHEK ET AL
2,782,055
BUMPER HITCH FOR TRAILER
Filed Jan. 25, 1956
2 Sheets-Sheet 1
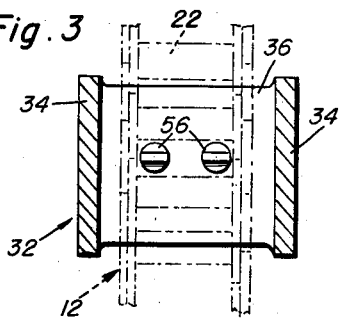
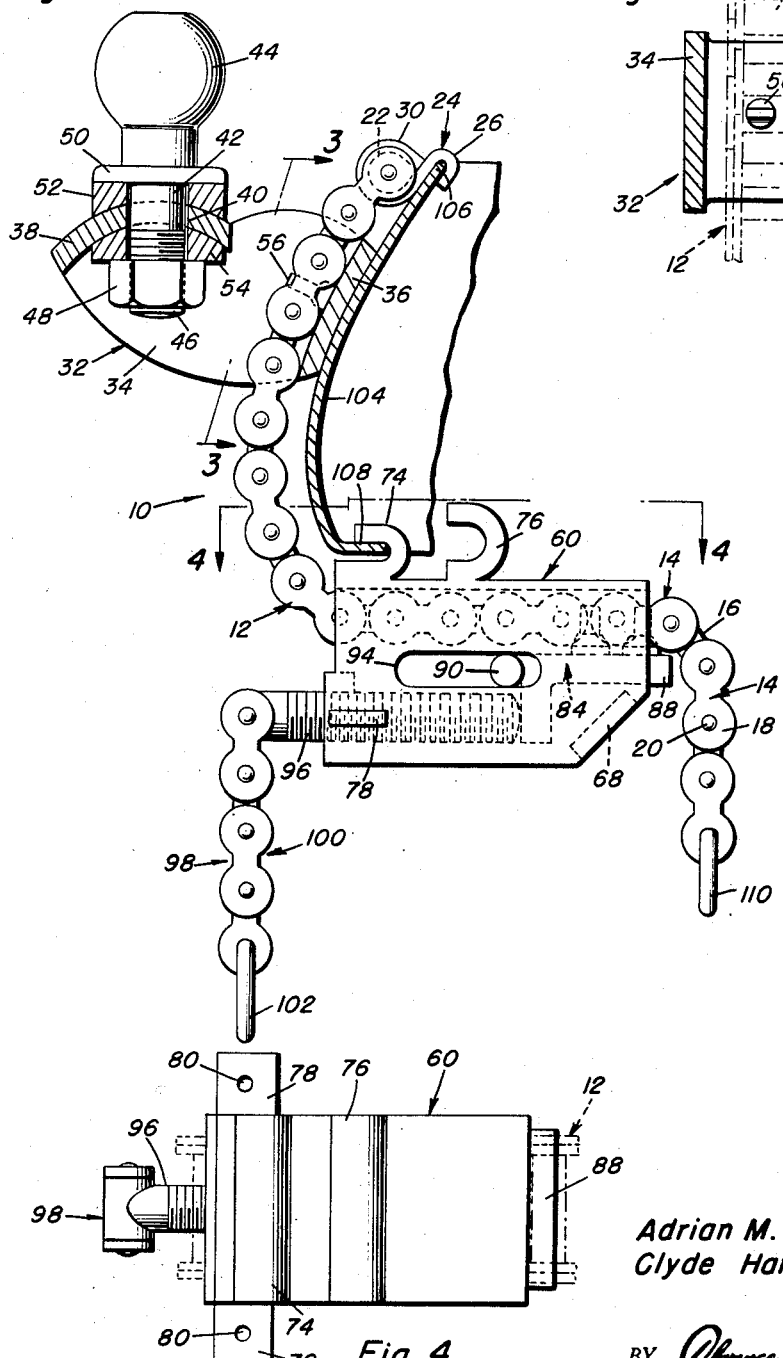
Adrian M. Maschek
Clyde Hartline
INVENTORS Feb. 19, 1957  A. M. MASCHEK ET AL  2,782,055
BUMPER HITCH FOR TRAILER
Filed Jan. 25, 1956  2 Sheets-Sheet 2
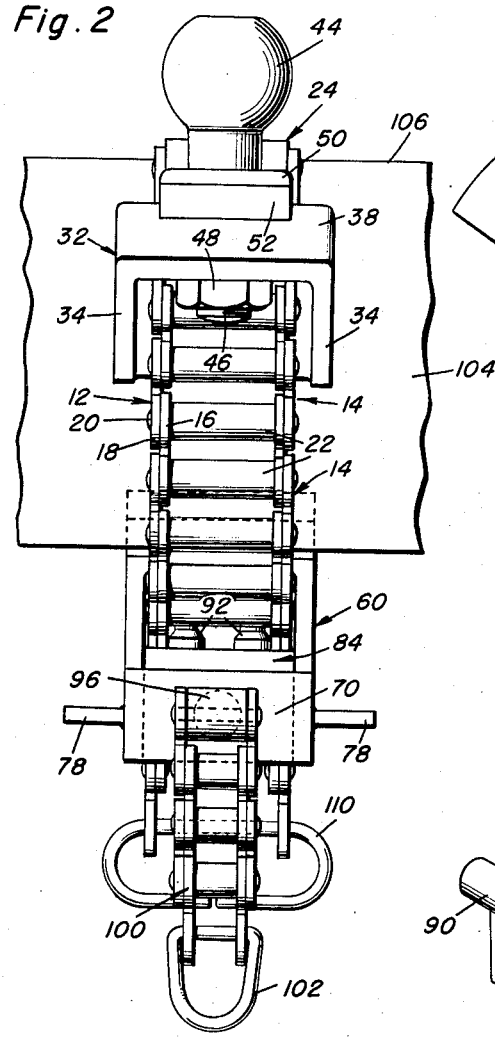
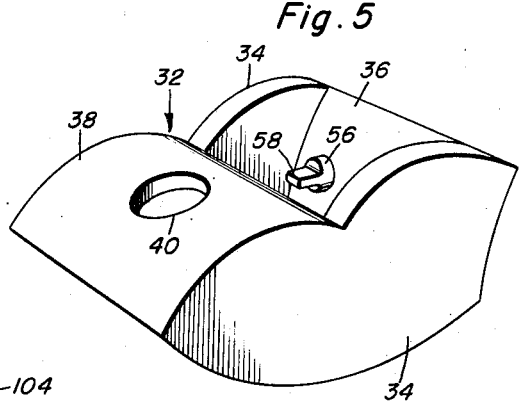
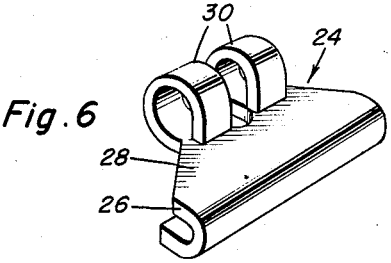
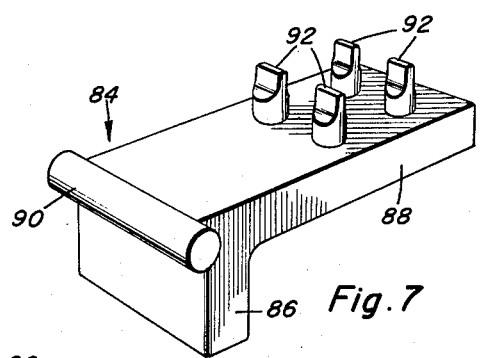
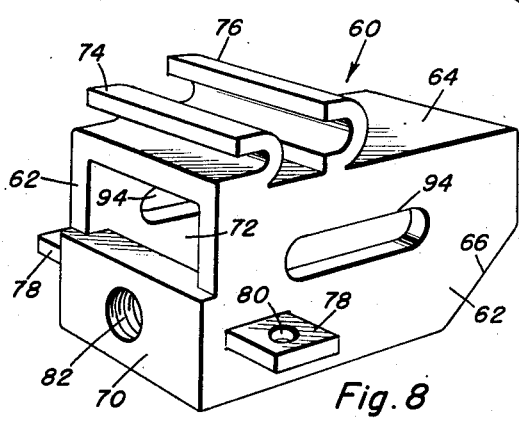
Adrian M. Maschek
Clyde Hartline
INVENTORS United States Patent Office 2,782,055
Patented Feb. 19, 1957

2,782,055
BUMPER HITCH FOR TRAILER
Adrien M. Maschek and Clyde Hartline, New Orleans, La., assignors of one-third to Ludovic J. Gerrets, New Orleans, La.

Application January 25, 1956, Serial No. 561,241
9 Claims. (Cl. 280—502)

This invention relates in general to new and useful improvements in trailer hitches, and more particularly to improvements in details of a hitch structure for mounting the hitch ball on a vehicle bumper.

Heretobefore substantially all bumpers of vehicles were of the same design. However, in recent years the design of automobile bumpers have not only varied according to the make of vehicle, but also from year to year in the same make of vehicle. As a result, it is practically impossible for an automotive supply house to stock bumper hitches which will fit all makes of bumpers. Further, because the hitch ball must be vertically disposed, while the structural details of certain hitches may permit their attachment to various makes of bumpers, when mounted on the different bumpers the hitch ball will not be properly positioned.

It is therefore the primary object of this invention to provide a bumper hitch which is of the universal type inasmuch as it may be attached to bumpers of all designs without any changes whatsoever in the structural details thereof.

Another object of this invention is to provide an improved hitch structure for mounting a hitch ball on a bumper, the hitch structure being of such a nature whereby the hitch ball may be mounted in a vertical position irrespectively of the particular cross section of the bumper to which it is being attached.

Still another object of this invention is to provide an improved hitch construction for mounting a hitch ball on a vehicle rear bumper, the hitch construction being of a relatively simple nature and at the same time so designed whereby it will firmly and securely grip a vehicle bumper to prevent any shifting whatsoever of the hitch ball with respect to the vehicle bumper.

A further object of this invention is to provide an improved hitch structure for mounting a hitch ball to a vehicle bumper, the hitch structure utilizing an elongated chain for both attaching the hitch structure to the vehicle bumper and supporting the hitch ball relative thereto, there being provided suitable adjusting means for tensioning the chain whereby it will securely grip the vehicle bumper and a support for the hitch ball.

A still further object of this invention is to provide an improved hitch structure for vehicle bumpers, the hitch structure being of such a nature whereby it may be quickly and easily attached to the vehicle bumper without any modification whatsoever to the bumper and with a minimum of expenditure of both time and effort.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical sectional view taken through a vehicle rear bumper and shows mounted on the same the bumper hitch for a trailer which is the subject of this invention, a portion of the bumper hitch being broken away and shown in section for purposes of clarity;

Figure 2 is a fragmentary rear elevational view of the vehicle bumper and shows further the relationship of the bumper hitch with respect to the bumper;

Figure 3 is a fragmentary vertical sectional view taken substantially upon the plane indicated by the section line 3—3 of Figure 1 and shows the specific details of the connection between the support for the hitch ball and the chain, the chain being shown in dotted lines for purposes of clarity;

Figure 4 is a top plan view of the lower bumper engaging fitting removed from the remainder of the bumper hitch, as viewed on line 4—4 of Fig. 1, the chain of the bumper hitch being shown in dotted lines;

Figure 5 is an enlarged perspective view of the support for the hitch ball removed from the remainder of the bumper hitch, the hitch ball being also removed for purposes of clarity;

Figure 6 is an enlarged rotated perspective view of the upper bumper engaging fitting and shows the same removed from the chain in order to illustrate the details thereof;

Figure 7 is an enlarged perspective view of a chain anchor which is normally carried by the lower bumper engaging fitting and shows the specific details thereof; and Figure 8 is an enlarged perspective view of the lower bumper engaging fitting with the chain anchor and the anchor positioning means normally carried thereby removed therefrom for purposes of clarity.

Referring now to the drawings in detail, it will be seen that there is illustrated the bumper hitch which is the subject of this invention, the bumper hitch being referred to in general by the reference numeral 10. The bumper hitch 10 includes an elongated chain which is referred to in general by the reference numeral 12. The chain 12 is preferably of the roller type and includes a plurality of sections 14 which are connected together by suitable straps 16. Each of the sections 14 includes a pair of spaced side plates 18 which are connected together by pins 20. Mounted on each of the pins 20 is a roller 22 which extends between its respective side plates 18. Also disposed on each of the pins 20 and between the roller 22 and its respective side plate 18 is one end of each of the straps 16.

Referring now to Figure 6 in particular, it will be seen that there is illustrated a first and upper bumper engaging fitting which is referred to in general by the reference numeral 24. The bumper engaging fitting 24 includes an upper hook portion 26 which is downwardly opened. The hook portion 26 includes an extension 28 which terminates in a pair of transversely spaced fingers 30 which are bent to have a circular cross section. The fingers 30 engage about the uppermost roller 22 of the chain 12.

Referring now to Figure 5 in particular, it will be seen that there is illustrated a hitch ball support which is referred to in general by the reference numeral 32. The hitch ball support 32 may be suitably fabricated in any desired manner and includes a pair of spaced side plates 34 which are connected together at their forward ends by a bumper engaging flange 36. The bumper engaging flange 36 has a slightly curved cross section, as is best illustrated in Figure 1. The upper rear portions of the side plates 34 are connected together by a hitch ball mounting flange 38. The hitch ball mounting flange 38 includes a vertically disposed aperture 40 in which there is received a shank 42 of a hitch ball 44. The shank 42 includes a lower threaded portion 46 on which there is disposed a nut 48. The hitch ball 44 has a collar 50 at the upper end of the shank 42. Mounted on the shank 42 below the collar 50 is a first curved washer 52. A second curved washer 54 is carried by the shank and engages the underside of the flange 38. The washers 52 and 54 are such that they firmly engage the flange 38 and mount the hitch ball 44 in an upright position.

Referring now to Figure 3 in particular, it will be seen that the rear face of the bumper engaging flange 36 is provided with a pair of transversely aligned pins 56. The pins 56 include reduced outer portions 58 which facilitate their positioning between adjacent rollers of the chain 12.

Referring now to Figure 8 in particular, it will be seen that there is illustrated a lower bumper engaging fitting which is referred to in general by the reference numeral 60. The lower bumper engaging fitting 60 includes a pair of spaced parallel side plates 62 which are connected together by a top wall 64. The forward and lower portions of the side walls 62 are cut off at an angle as at 66 and are connected together by a lower front connecting member 68, which is best illustrated in Figure 1. The side walls 62 are also connected together at their lower rear edges by a block 70. There is defined at the rear of the fitting 60 by the side walls 62, the top wall 64 and the block 70 a chain receiving opening 72.

In order that the bumper engaging fitting 60 may be engaged with lower portions of bumpers of all types, there is carried by the top wall 64 at the rear thereof a first hook 74. The first hook 74 is relatively low and opens rearwardly. Also carried by the top wall 64, but forwardly of the hook 74 is a second hook 76. The second hook 76 also opens rearwardly, but extends vertically thereabove. Thus either the hook 74 or the hook 76 may be selectively engaged with a lower edge of a bumper to mount the bumper hitch 10.

The side walls 62 are provided adjacent the rear edges thereof with projecting ears 78. The ears 78 have openings 80 therethrough and the purpose of the ears 78 will be set forth in more detail hereinafter. Further, the block 70 is provided with a longitudinally extending, internally threaded bore 82 whose purpose will also be set forth in more detail hereinafter.

Referring now to Figure 7 in particular, it will be seen that there is illustrated the chain anchor which is referred to in general by the reference numeral 84. The chain anchor 84 is generally L-shaped in outline and includes a rear vertical flange 86 and an elongated upper horizontal flange 88. Disposed at the intersection of the rear face of the flange 86 with the upper face of the flange 88 is a transversely extending pivot pin 90 which extends on opposite sides of the flanges 86 and 88. The chain anchor 84 also includes two pairs of upstanding anchoring pins 92 which are disposed on the forward portion of the flange 88 and extend upwardly therefrom.

The side walls 62 of the lower bumper engaging fitting 60 are provided with transversely aligned, elongated slots 94. The slots 94 have received therein for both longitudinal sliding movement and for pivotal movement ends of the pivot pin 90.

In order that the chain anchor 84 may be retained in an adjusted position with respect to the bumper engaging fitting 60, there is threadedly engaged in the bore 82 a threaded pin 96. The pin 96 has pivotally connected to the rear end thereof a handle which is referred to in general by the reference numeral 98. The handle 98 is in the form of a short section of chain 100. The chain 100 terminates in an eye 102 which may be suitably anchored to one of the ears 78 to prevent accidental rotation of the pin 96.

Referring now to Figure 1 in particular, it will be seen that there is illustrated a bumper 104 which is of a conventional cross section. The bumper 104 includes an upper edge 106 and a lower edge 108.

When it is desired to mount the hitch ball 44 on the bumper 104, the fitting 24 has the hook portion 26 thereof engaged over the upper edge 106 of the bumper 104. The chain 12 is then passed down between the side walls 34 of the support 32. This is facilitated by a loop-type handle 110 formed on the lower free end of the chain 12. The pins 56 are engaged with the proper section of the chain 12 to position the hitch ball 44 at the desired height and in a vertical position, as is best illustrated in Figure 1.

After the support 32 has been connected to the chain 12, the hook 74 of the bumper engaging fitting 60 is engaged over the lower edge 108 of the bumper 104 in the position best illustrated in Figure 1. At this time the pin 96 is moved substantially out of the bumper engaging fitting 60 and the pivot pin 90 is moved rearwardly in the slots 94 so that the forward edge of the flange 88 clears the connecting member 68. Thus the chain anchor 84 is permitted to pivot downwardly so that the chain 12 may be passed into the opening 72 and above the chain anchor 84. The chain 12 is then pulled tight by hand and the flange 88 pivoted upwardly to its horizontal position so that the pins 94 engage with the rollers 22 of the chain 12. Then by screwing in the pin 94 utilizing the handle 98, the chain anchor 84 will be moved to the right, as viewed in Figure 1, to completely tension the chain 12. After the chain 12 has been completely tensioned, it is locked to the bumper 104 against relative movement due to the anchoring of the opposite end portions thereof by the upper bumper engaging fitting 24 and the lower bumper engaging fitting 60. At the same time, the chain 12 clamps the bumper engaging flange 36 of the support 32 firmly against the bumper 104 so as to prevent any movement of the support 32 with respect to the bumper 104. Thus the ball hitch 44 is releasably mounted on the bumper 104 in a rigid and secure position at the desired height and in a vertical position.

It is to be understood that inasmuch as the cross section of bumpers vary, it may be necessary to raise or lower the support 32 so that the bumper engaging flange 36 engages a complementary portion of the bumper to retain the hitch ball 44 in a vertical position. Further, it may be necessary to use the hook 76 of the fitting 60 in lieu of the hook 74 depending upon the details of the lower part of the bumper on which the bumper hitch 10 is being mounted.

From the foregoing description of the present invention, it will be readily apparent that there has been devised a bumper hitch which is universal. Because of the flexible nature of the chain 12 which represents the primary connecting element of the bumper hitch 10 and through the use of simplified anchoring means for the chain, the bumper hitch 10 is adaptable to all types of bumpers which are used on modern vehicles. Further, because of the manner in which the chain 12 is adjustably anchored, it may be tensioned to the extent that the bumper hitch 10 cannot shift with respect to the bumper on which it is mounted. This is highly desirable inasmuch as there is a tendency on the part of the trailer to shift the bumper hitch transversely of a bumper and if the bumper hitch is not centered, the trailer will not track properly.

Through the use of the chain 12 and the interlocking relation of the various fittings connected thereto, the use of headed fasteners is entirely eliminated. Thus, the bumper hitch 10 may be attached to and removed from bumpers without the use of any tools whatsoever.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain.

2. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said lower fitting being in the form of a housing, a bumper engaging hook on said housing, said chain anchor being disposed within said housing, said housing retaining said chain connected to said chain anchor.

3. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said lower fitting being in the form of a housing, a bumper engaging hook on said housing, said chain anchor being disposed within said housing for sliding and pivoting movement, said adjusting means retaining said chain anchor in engagement with said chain.

4. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said lower fitting being in the form of a housing, a bumper engaging hook on said housing, said housing including a top wall, said chain anchor being mounted within said housing for sliding and pivoting movement, said chain anchor being disposed below said top wall, said chain overlying said chain anchor and being retained in engagement therewith by said top wall.

5. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said lower fitting being in the form of a housing, a bumper engaging hook on said housing, said housing including a top wall, said chain anchor being mounted within said housing for sliding and pivoting movement, said chain anchor being disposed below said top wall, said chain overlying said chain anchor and being retained in engagement therewith by said top wall, said chain anchor having a pivot, said adjusting means engaging said chain anchor below said pivot.

6. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said lower fitting being in the form of a housing, a bumper engaging hook on said housing, said chain anchor being disposed within said housing, said housing retaining said chain connected to said chain anchor, said chain anchor including at least one upstanding pin passing into said chain.

7. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said flange having a bumper engaging face and a chain engaging face, said locking means being on said chain engaging face and being in the form of at least one pin passing into said chain.

8. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said support being of an open frame construction, said chain passing through said support.

9. A bumper type trailer hitch comprising an elongated chain, an upper bumper engaging fitting connected to one end of said chain, a lower bumper engaging fitting, a chain anchor adjustably carried by said lower bumper engaging fitting, a lower portion of said chain being releasably connected to said chain anchor, a hitch ball support having a bumper engaging flange, locking means on said flange locking said support to said chain intermediate said upper fitting and said chain anchor, and adjusting means carried by said lower fitting retaining said chain anchor relative to said lower fitting to tension said chain, said flange having a bumper engaging face and a chain engaging face, said locking means being on said chain engaging face and being in the form of at least one pin passing into said chain, said support being of an open frame construction, said chain passing through said support.

References Cited in the file of this patent

UNITED STATES PATENTS

| | | |
|---|---|---|
| 2,432,249 | Pearson | Dec. 9, 1947 |
| 2,468,438 | Gahen | Apr. 26, 1949 |
| 2,575,596 | Rettinger | Nov. 20, 1951 |